Nov. 25, 1969  H. R. COLLINS, JR  3,480,032
TEMPERATURE COMPENSATION FOR VISCOSITY MEASUREMENTS
Filed Aug. 22, 1966  4 Sheets-Sheet 1

INVENTOR
H. R. COLLINS, JR.
BY Young & Quigg
ATTORNEYS

INVENTOR
H. R. COLLINS, JR.

United States Patent Office  3,480,032
Patented Nov. 25, 1969

3,480,032
TEMPERATURE COMPENSATION FOR VISCOSITY MEASUREMENTS
Henry R. Collins, Jr., Bartlesville, Okla., assignor to Phillips Petroleum Company, a corporation of Delaware
Filed Aug. 22, 1966, Ser. No. 574,038
Int. Cl. G05d 11/02; G01n 11/02
U.S. Cl. 137—92                                      9 Claims

ABSTRACT OF THE DISCLOSURE

A viscosity measuring device, which produces a first output signal representative of a measurement of the viscosity of a first fluid, is combined with a temperature compensating circuit which produces a second output signal representative of the difference between the viscosity of a given fluid at the temperature of the said first fluid and the viscosity of said given fluid at a reference temperature, to produce a composite output signal representative of the viscosity of said first fluid at the reference temperature.

---

This invention relates to temperature compensation for viscosity measurements. In one of its aspects it relates to a method and means for compensating the viscosity measurements of a viscosity measuring means to a predetermined temperature by means of a thermistor probe, the output of which is connected to the output of the viscosity measuring means so that the combined output signal from said thermistor probe and said viscosity measuring means is proportional to the viscosity of a fluid at a predetermined temperature.

The viscosity of a material at a particular temperature is an important property which is used to classify materials such as asphalts. For example, asphalt specifications require that the asphalt have a certain viscosity at a temperature of 140° F. or 210° F. In making asphalt to different specifications, a base asphalt is blended with diluents such as naphtha or kerosene to give a desired viscosity specification asphalt. When mixing specification asphalt, it is difficult and impractical to maintain the asphalt at a standard temperature. Thus, when measuring the viscosity of a blended asphalt, it is necessary to reference the viscosity measurement back to a standard temperature. FIGURE 1 shows the relationship between the viscosity of asphalt and the temperature of asphalt. Curves a, b, c, d, and e represent viscosity versus temperature curves for different asphalt compositions. As can be seen in FIGURE 1, the viscosity of asphalt varies non-linearly with the temperature of asphalt and the relationship between the log of viscosity and the temperature such that the curve is concave upwardly.

Attempts have been made to compensate viscosity for temperature to reference the measured viscosity at a given temperature back to a predetermined temperature by approximating the curves shown in FIGURE 1 by a straight line. This method introduces an error as much as 10 percent in the viscosity measurement of the fluid. Further, these temperature compensating instruments have used a standard resistance which varies linearly with temperature. This standard resistance, being encased in a heavy metal casing was found to have a reaction time in the order of 1 to 2 minutes which is too slow for a refinery process stream.

SUMMARY OF THE INVENTION

I have now discovered that a thermistor probe can be used for temperature compensating viscosity measurements to give a more accurate compensation with a shorter reaction time.

In a given process stream in which a base asphalt and a diluent material are blended and passed to a loading truck, the composition and temperature of the stream can vary over a large range. Thus, if the viscosity measuring instrument and the temperature compensating instrument are located at different portions of the flowing stream, the temperature compensation may not accurately reflect the temperature or composition of the asphalt measured by the viscosity measuring means.

I have found that this problem of temperature and composition variations within a blended stream can be avoided by enclosing the temperature compensating means and the viscosimeter in a sinple casing.

By various aspects of this invention, one or more of the following, or other, object can be obtained.

It is an object of this invention to provide a method and means for more accurate temperature compensation for viscosity measurements.

It is a further object of this invention to provide a method and means of eliminating excessive reaction time for temperature compensation of viscosity measurements.

It is a still further object of this invention to provide a method and means of eliminating inaccurate temperature compensation due to variation of temperature and composition in a given feed stream.

It is yet another object of this invention to provide a method and means of automatically blending a ratio of components to a desired viscosity.

Other aspects, objects, and the several advantages of this invention are apparent to one skilled in the art from a study of this disclosure, the drawings, and the appended claims.

According to the invention, there is provided a thermistor probe which is so calibrated that the shape of the resistance versus temperature curve approximate the viscosity versus temperature curve of a given fluid and the output of the thermistor probe is adapted to be connected with the output from a viscosity measuring means such that the combined output from the viscosity measuring means and the thermistor probe produces a signal proportional to the viscosity of a fluid at a predetermined temperature.

DESCRIPTION OF THE PREFERRED EMBODIMENTS

Figure 2:
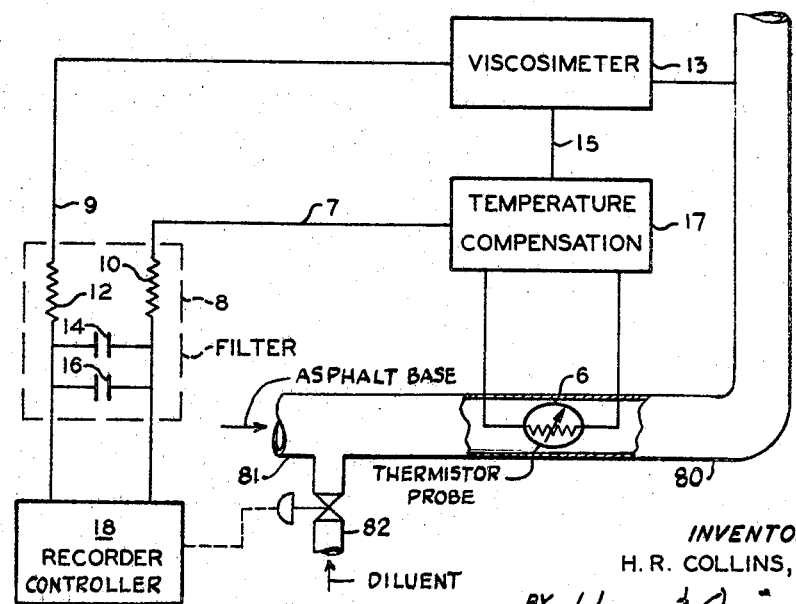
FIGURE 2 is a schematic representation of the temperature compensation viscosity measuring means according to the invention.

Referring now to the drawings, specifically FIGURE 2, a viscosimeter 13 measures the viscosity of a fluid such as asphalt and produces a signal across leads 15 and 9 representative of the viscosity of the fluid so measured. The viscosimeter 13 can be any suitable instrument for measuring the viscosity of a fluid and producing a signal representative of the viscosity. A suitable viscosimeter is a "Dynatrol" Viscosimeter produced by Automation Products, Inc., 3030 Maxroy, Houston, Tex. The output from the viscosimeter is connected by lead 15 in series with a temperature compensation means 17 which produces a signal according to a temperature measured by thermistor probe 6. The thermistor probe 6 is placed in the fluid line next to the viscosity measuring means 13 as will be further hereinafter described. A combined signal representative of the viscosity of the fluid referenced to a predetermined temperature is passed through filter 8 via leads 7 and 9 to recorder 18. Filter 8 is a low pass filter adapted to filter out background noises. Filter 8 is composed of resistances 10 and 12 connected in series in leads 7 and 9, respectively, and capacitors 14 and 16 shunted across leads 7 and 9. For an output from the viscosimeter of 0 to 10 millivolts, resistances of 1 kilohm could be used in resistances 10 and 12 and capacitors of the order of 3000 microfarads could be used for 14 and 126. It is understood that one or three or more capacitors could be in place of the two capacitors 14 and 16 shown in filter 8. Recorder 18 can be any suitable recording means for converting the signal sensed across leads 7 and 9 to a visual representation thereof. A suitable recorder is Brown Electronik Recorder, produced by Honeywell, Inc., Philadelphia, Pa.

Figure 1:
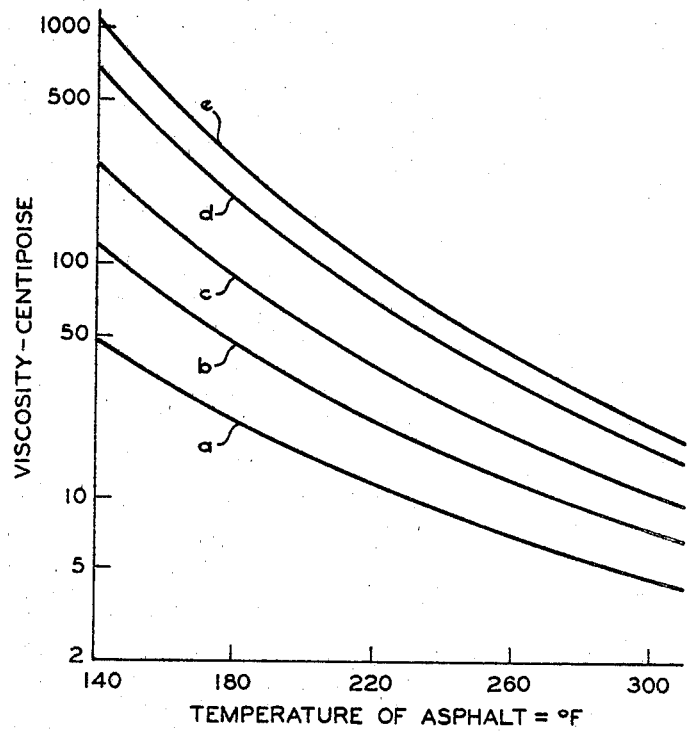
FIGURE 1 is a graphical representation of the relationship between viscosity of asphalt and the temperature thereof.
Figure 3:
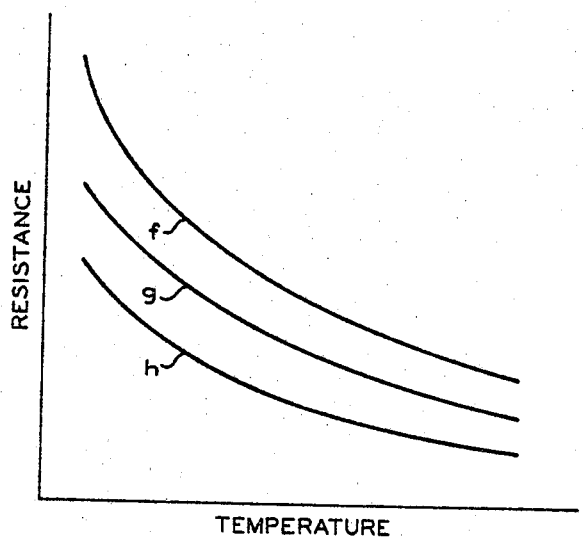
FIGURE 3 is a graph showing the relationship between resistance and temperature for a thermistor unit by itself and in parallel with various other resistors.
Figure 4:
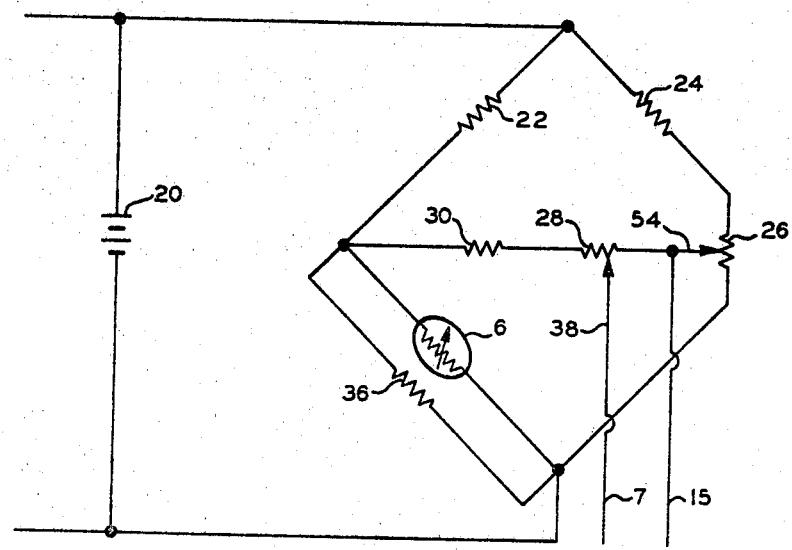
FIGURE 4 is a schematic representation of a temperature compensating circuit shown in FIGURE 2.

Referring now to FIGURE 3 which shows a graph of a thermistor unit which is calibrated to approximate the shape of the viscosity versus temperature curve as shown in FIGURE 1. the curve of a single thermistor unit is representative of curve $f$. Curves $g$ and $h$ represent the resistance across the thermistor which is connected in a circuit with parallel different resistances. By connecting across the thermistor different fixed resistances, the curvature of the curve can be altered. Thus, it can be seen by selecting the proper resistance to attach in parallel with the thermistor, that the curvature of the viscosity versus temperature curve for a given fluid such as asphalt can be approximated. Referring now to FIGURE 4, there is shown a suitable temperature compensation circuit for use in the system schematically shown in FIGURE 2. A direct current source 20 applies a potential across a balance circuit composed of resistances 22 and 24, thermistor 6 in parallel with resistor 36, and resistance 26, a portion of which forms the resistance opposite 6 and 36. Slidable contact 54 is adapted to divide the potential across resistance 26 and is adjusted so that the output across the balance circuit, i.e., current through resistances 30 and 28, is zero when thermistor 6 is at a preselected temperature. Thus, for example, if it were desired to reference the viscosity to 210° F., when thermistor 6 was set at 210° F., slidable contact 54 would be adjusted so that there was no current flowing through resistances 28 and 30. Thus, the combination of 54 and 26 formed a zero point potentiometer. Slidable contact 38 is provided to pick off a variable potential across resistance 28 to supply output through leads 15 and 7 from the balance circuit. In calibrating the instrument, after the zero point potentiometer has been adjusted, a known viscosity fluid at a standard temperature is heated to a known temperature other than the standard temperature to which the zero point potentiometer is referenced. The thermistor 6 is placed in the heated fluid and the viscosimeter 13 is also placed in the fluid to measure the viscosity. The combined output from the viscosimeter and the temperature compensating circuit, i.e., across lines 7 and 9 is sensed by recorder 18. The slidable contact 38 is then adjusted until the recorder indicates the known viscosity of the fluid being sensed. For example, is an asphalt having a viscosity of 40 centipoises at 210° F. was heated to a temperature of 160° F. and the viscosimeter 13 and thermistor probe 6 were inserted in the fluid at that temperature, the output of the recorder would show a viscosity of greater than or less than 40. The slidable contact 38 is then adjusted until the output from the recorder shows a viscosity of 40. After this has been done, the instrument is calibrated and ready for use for measuring fluids of similar nature to that calibrated for any given temperature. The viscosity of the fluid so measured will be referenced to 210° F. regardless of the temperature at which the fluid is measured.

Figure 5:
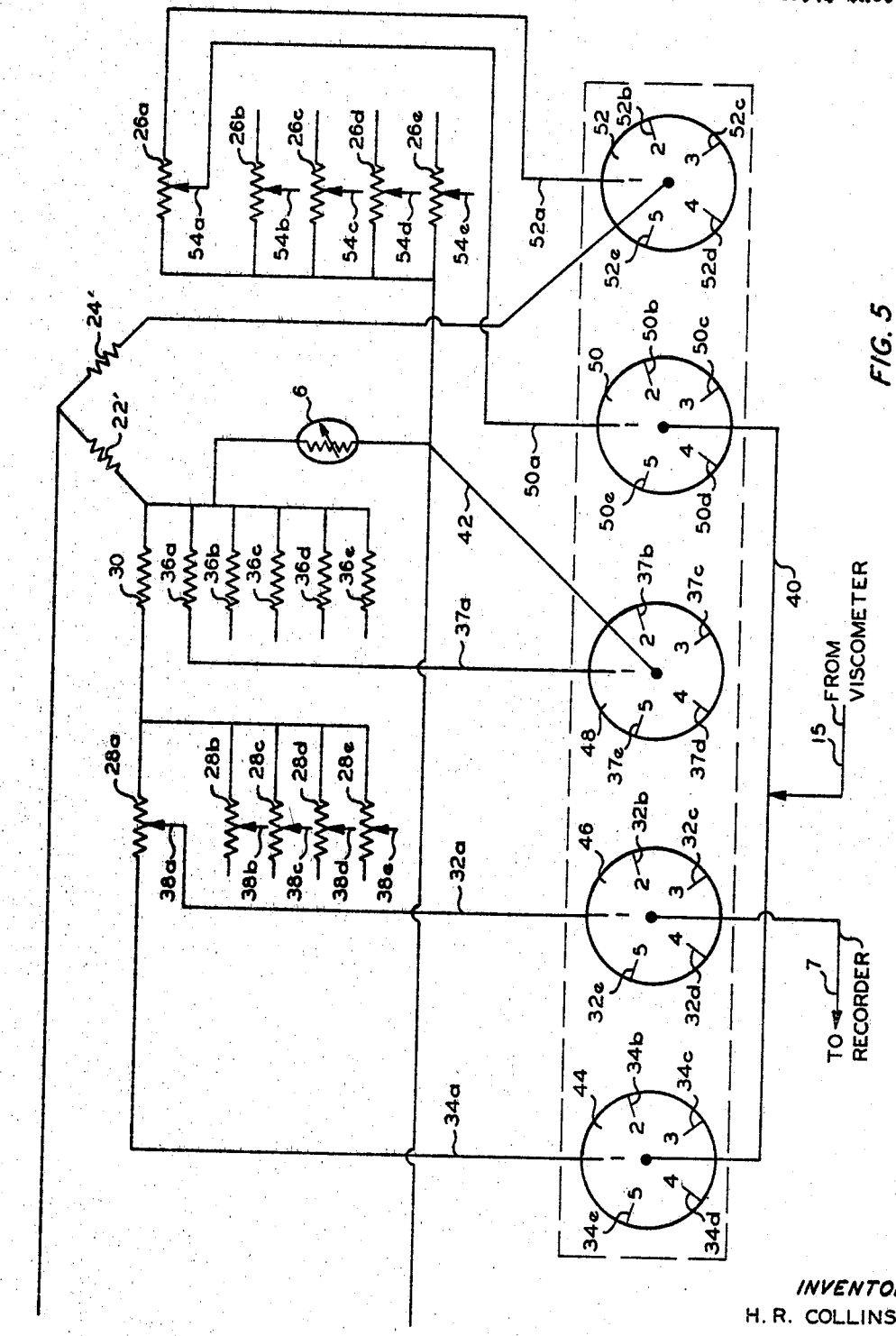
FIGURE 5 is a schematic representation of another embodiment of the invention showing another temperature compensation circuit shown in FIGURE 2.

When it is desirable to compensate for a number of different products having different viscosity versus temperature curves, the temperature compensating circuit of FIGURE 5 is used. Referring now to FIGURE 5, where similar numbers have been used to designate similar parts, a five contact, five position selector switch comprising poles 44, 46, 48, 50 and 52 changes the output through lines 15 and 7 depending on the fluid to be sensed. The circuit is substantially the same as that shown in FIGURE 4 except there are five resistors in place of resistance 26, five slidable contacts in place of 54, five resistors in place of calibrating resistor 36, five resistors for output resistor 28 in place of the one resistance 28 and five slidable contacts in place of contact 38 in FIGURE 4. FIGURE 5 shows the selector switch on position 1. The wires from the selector switch to the resistors for positions 2 through 5 on the selector switch have been eliminated for purposes of simplicity. In position 1, lead 34a connects lead 15 through contact 44 to resistor 28a. Slidable contact 38a is connected to lead 7 via lead 32a and contact 46. Compensating resistor 36a is connected in parallel with thermistor probe 6 by the slidable contact 48. Zero point potentiometer resistor 26a is connected to resistor 24 and to thermistor slidable contact 6 through contact 52 and contact 48, respectively. The zero point adjustment is made by slidable contact 54a which is connected to contact 50 which in turn is connected to lead 15 through lead 40. Resistor 36a is selected to be used in parallel with thermistor probe 6 to give the desired curvature for a given fluid as was resistor 36 in FIGURE 4. Similarly, sliding contact 54a is adjusted to give a reference temperature calibration and sliding contact 38a is selected to give a temperature calibration for the given fluid. When selector switch is turned to position 2, lead 34b will be connected to resistance 24b, lead 32b will be connected to sliding contact 38b, lead 37b will be connected to resistance 36b, lead 50b will be connected to sliding contact 54b, and lead 52b will be connected to resistance 26b. With the selector switch in position 2, the instrument will then be calibrated as hereinbefore described for a second fluid which has different characteristics than the first fluid. Similarly, when selector switch is turned to position 3, all leads with letter C will be connected to resistances and probes with letter C. Thus, the instrument can be calibrated to measure five different kinds of fluids. As is understood by one skilled in the art, more than five or less than five fluids could be measured on similar circuits by simply adjusting the number of positions on a given selector switch corresponding to a given number of circuits including resistances 28, slidable contacts 38, resistances 36, 26 and slidable contacts 54.

Figure 6:
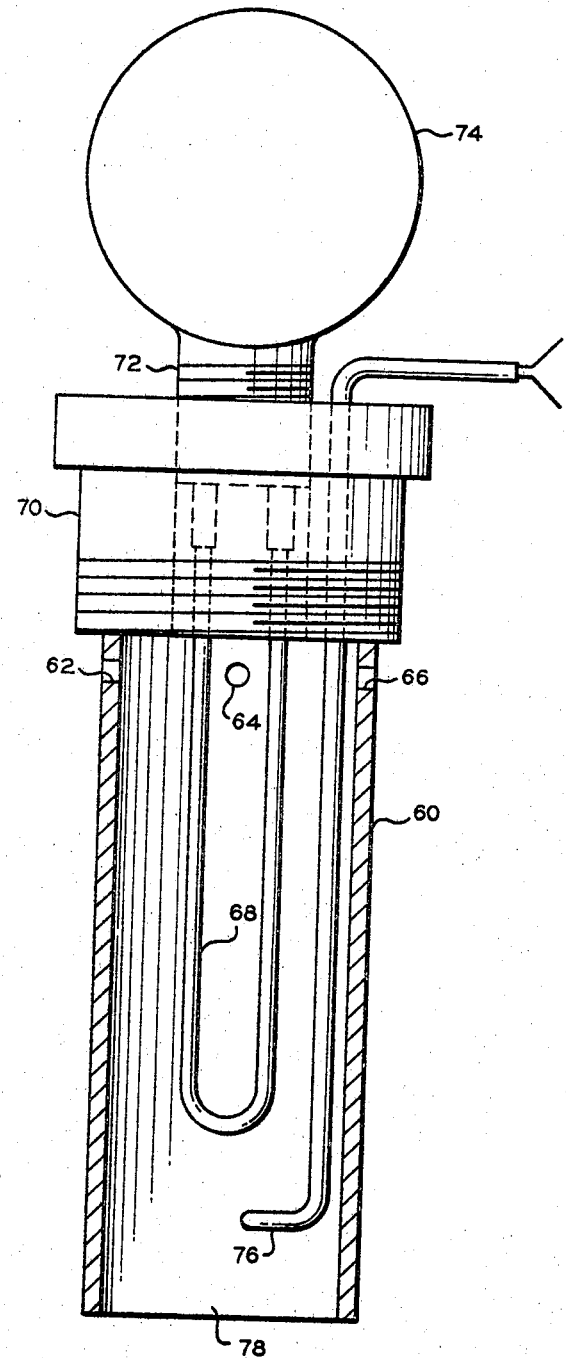
FIGURE 6 is a schematic representation of a combined viscosity measuring and temperature compensating apparatus according to one embodiment of the invention.

Referring now to FIGURE 6, there is shown an apparatus for eliminating inaccuracies in viscosity measurements corrected to a given temperature for variations in temperature and compositions in a given feed line. A housing 60 having a plurality of holes 62, 64 and 66 is connected to a base 70 which holds a vibratable paddle 68 at 72. An alternating current source vibrates at a constant frequency paddle 68. The amplitude of vibration is sensed by an electromechanical means (not shown but positioned in casing 74) which delivers a signal representative of the amplitude of the vibrating paddle 68. The fluid to be measured enters the instrument through holes 62, 64 and 66 and leaves through open end 78. According to one embodiment of the invention, a small thermistor probe 76 is placed adjacent to the paddle 68 to measure a temperature of the same fluid as contacted by paddle 68. For optimum measurements, the casing 60 is inserted into a flowing stream at an elbow to get optimum temperature and composition uniformity. The vibratable paddle is connected to housing 74 which contains the vibrational means for paddle 68 and sensing means for the vibrational amplitude of 68.

The invention can be used to regulate the blending in mixing conduit 80 of an asphalt base from conduit 81 with a diluent such as naphtha or kerosine from conduit 82. The instrument measures the viscosity of the blended asphalt and, responsive to the viscosity measurement, the rate of addition of asphalt base and/or diluent is adjusted to maintain a predetermined viscosity of blended asphalt, for example by recorder-controller 18 manipulating valve 83 located in conduit 82. The measuring instrument is preferably located at an elbow in the pipe.

I claim:
1. An apparatus for temperature compensating viscosity measurements comprising:
   (a) a thermistor probe, a plurality of resistors and means selectively connecting at least one of said resistors in parallel with said thermistor probe so that the resulting non-linear shape of the resistance versus temperature curve approximates over a significant range of temperature the non-linear shape of a viscosity versus temperature curve of a given fluid similar to a first fluid to be measured,
   (b) a temperature compensating circuit connected to said thermistor probe, said temperature compensating circuit being adapted to give an output voltage representative of the difference between the viscosity of said given fluid at the temperature of said probe and the viscosity of said given fluid at a predetermined reference temperature,
   (c) viscosity measuring means for measuring the viscosity of said first fluid,
   (d) means connecting the output of said temperature compensating circuit with the output of said viscosity measuring means such that the combined output from said viscosity measuring means and said temperature compensating circuit is a signal representative of the viscosity of said first fluid referenced back to said predetermined reference temperature.

2. An apparatus according to claim 1 wherein said temperature compensating circuit output is connected in series with said viscosity measuring means.

3. An apparatus according to claim 2 wherein said temperature compensating circuit comprises a balance circuit in which said thermistor probe is contained, said balance circuit containing means for adjusting the output of said balance circuit to zero at said predetermined reference temperature, said balance circuit containing a calibration means to adjust the output of said balance circuit to compensate for temperature in measuring the viscosity of said first fluid.

4. An apparatus according to claim 3 wherein said calibration means comprises a variable potentiometer adjusted to give an output signal proportional to the difference in viscosity of a fluid at said predetermined reference temperature and at a temperature different from said predetermined reference temperature.

5. An apparatus according to claim 3 wherein said calibration means comprises a plurality of potentiometers and means for alternately switching one of said plurality of potentiometers into said balance circuit, each potentiometer of said plurality of potentiometers being adjusted to give an output signal proportional to the difference in viscosity of a different fluid at said predetermined reference temperature and at a temperature different from said predetermined reference temperature.

6. An apparatus according to claim 1 wherein said viscosity measuring means comprises a paddle vibrated by a constant frequency alternating electrical potential, said paddle being adapted to be positioned in said first fluid being tested, and having a sensing means to sense the vibrational amplitude of said paddle and to produce a signal proportional to said amplitude.

7. An apparatus according to claim 6 wherein there is provided a housing enclosing said viscosity measuring means and said thermistor probe, said housing having an inlet and an outlet means for the flow of said first fluid to pass therethrough, said thermistor probe being positioned adjacent said viscosity measuring means to measure a temperature of the same fluid as contacted by said viscosity measuring means.

8. An apparatus according to claim 1 wherein there is further provided a recording means to sense the combined output from said viscosity measuring means and said temperature compensating circuit; said recording means having further a means to produce a visual indication of the viscosity of said first fluid at said predetermined reference temperature, a filter means connected at one end to said recording means and at another end to the combined output of said temperature compensating circuit and said viscosity measuring means, said filter being adapted to remove high frequency background signals from said combined output.

9. An apparatus for maintaining constant the viscosity of a blend of an asphalt base and a diluent in which there is a first conduit for supplying asphalt base to a mixing conduit, a second conduit for supplying diluent to said mixing conduit, the apparatus of claim 1 positioned in said mixing conduit to continuously sense the viscosity of blended asphalt in said mixing conduit, means responsive to the viscosity determination of said apparatus of claim 1 to adjust the flow of at least one of said asphalt base and said diluent to maintain a desired viscosity asphalt.

References Cited

UNITED STATES PATENTS

| 2,396,420 | 3/1946 | Hayward et al. | 73—54 XR |
| 2,484,761 | 10/1949 | Stock | 73—59 |
| 2,603,087 | 7/1952 | Von Hortenau | 73—59 |
| 2,633,016 | 3/1953 | Millington | 73—59 |
| 2,708,361 | 5/1955 | Boyle et al. | 73—59 |
| 2,837,913 | 6/1958 | Rich et al. | 73—59 |
| 2,896,656 | 7/1959 | Allen et al. | 137—92 |
| 2,929,010 | 3/1960 | Lancaster et al. | 73—59 XR |
| 2,973,000 | 2/1961 | Pearson | 137—92 XR |
| 3,100,390 | 8/1963 | Banks | 73—59 XR |

ROBERT G. NILSON, Primary Examiner

U.S. Cl. X.R.

73—59